United States Patent [19]
Meier

[11] 3,934,999
[45] Jan. 27, 1976

[54] COMPOSTING METHOD AND APPARATUS

[75] Inventor: Harold R. Meier, Minneapolis, Minn.

[73] Assignee: Judd Ringer Corporation, Eden Prairie, Minn.

[22] Filed: Apr. 18, 1973

[21] Appl. No.: 352,242

[52] U.S. Cl. .......................... 71/9; 71/23; 206/221; 206/223; 229/53; 229/DIG. 14
[51] Int. Cl.².. C05F 9/02; C05F 9/04; B65D 25/08; B65D 31/00
[58] Field of Search .......... 71/6, 9, 64 G, 23; 426/8; 206/223, 83.5; 229/53, DIG. 14

[56] References Cited
UNITED STATES PATENTS

| | | | |
|---|---|---|---|
| 2,285,834 | 6/1942 | Proctor | 71/9 |
| 2,337,686 | 12/1943 | Sherman | 71/9 |
| 2,954,285 | 9/1960 | Carlsson et al. | 71/9 |
| 2,961,322 | 11/1960 | Winterberg | 426/8 |
| 3,115,404 | 12/1963 | Carney | 71/6 |
| 3,236,605 | 2/1966 | Pierson | 71/9 X |
| 3,357,812 | 12/1967 | Snell | 71/9 |
| 3,672,945 | 6/1972 | Taylor | 71/64 G |

*Primary Examiner*—Charles N. Hart
*Assistant Examiner*—Ferris H. Lander
*Attorney, Agent, or Firm*—Frederick E. Lange

[57] ABSTRACT

A method of and apparatus for quickly composting organic material which involves the use of a flexible bag having a plurality of perforations through the body portion of the bag and a composting tablet having a water soluble binder in which is retained a large number of natural micro-organisms, the bag being filled with the organic material and an aqueous solution formed by adding the tablet to a predetermined amount of water. The open end of the bag is thereafter closed and periodically the bag is compressed to force out through the perforations gases resulting from decomposition and then fluffed to draw air into the bag through the perforations. The composting tablet preferably contains enzymes which accelerate the activity of the microorganisms and a nitrogen releasing substance to supply the nitrogen necessary for continued decomposition of the material being composted.

7 Claims, 6 Drawing Figures

COMPOSTING METHOD AND APPARATUS

BACKGROUND OF THE INVENTION

The desirability of composting waste organic material, particularly leaves and grass cuttings, has been recognized to an increasing extent in recent years. Such organic material when properly composted forms a very desirable fertilizer which contains certain ingredients not present in chemical fertilizers. The problem, however, of composting such material is that it is very difficult in the ordinary urban yard to provide for its composting without causing odor or unsightliness at the composting location. One method commonly employed is that of digging a pit. A proper composting action, however, requires the introduction of air from time to time and the exhaust of accumulated gases. This may be accomplished by periodically turning the material to admit air to the material being composted. This is more difficult to accomplish when the material is in a pit. Moreover, there is less likelihood in a pit of air entering the material being composted unless it is periodically turned.

An alternative method that has been employed is to provide a bin or a plurality of shelves all above the ground. Again, it is somewhat difficult to properly turn the material when it is in the bin. Furthermore, a bin can be relatively unsightly. While the bin more readily admits fresh air to the mixture being composted, it also tends to result in more drying out of the compost material. It is essential in a composting operation that the material being composted remains moist. Some of the same problems apply when a plurality of shelves are used.

To eliminate any odors resulting from composting and to facilitate the composting action, it has been proposed to employ various natural microorganisms. Enzymes are often included with these organisms to accelerate the activity of the organisms. While the use of such microorganisms accelerates the composting action, it still does not avoid some of the drawbacks pointed out above where either pits, bins or multiple shelf arrangements are employed.

SUMMARY OF THE PRESENT INVENTION

The present invention is concerned with a composting method and arrangement in which the material can be quickly composted in a manner which is relatively unsightly. The present invention involves the use of a flexible bag having a plurality of apertures through the body portion of the bag. The bag is filled with organic material to be composted and there is added thereto an aqueous solution formed by adding to a predetermined amount of water a substance containing a large number of minute particles which tend to facilitate decomposition of the organic material.

The apertures in the bag are sufficiently large to permit the ready escape of air and gas therethrough but sufficiently small to prevent the escape therethrough of any substantial amount of the organic material to be composted. In use, the end of the bag is closed after being filled with the material to be composted and the aqueous solution referred to. Periodically, the bag is compressed to force out of the bag gases accumulater therein as a result of the decomposition and then agitated to draw air therein through the apertures.

The bag is preferably of a dark color to absorb heat and thus increase the temperature within the bag. The bag is preferably of a plastic substance such as polyethylene and the apertures are made by perforating the same.

The minute particles are preferably natural microorganisms and may be introduced into the aqueous solution by being incorporated in a tablet having a water soluble binder. Desirably, the tablet also contains enzymes and some nitrogen-releasing substance.

One convenient method of compressing the bag is to step on it gently. Thereafter, the bag can be fluffed to draw in air to replace the gas which has been exhausted when the bag was compressed.

The invention not only involves the novel method described above but also the novel composting apparatus comprising the tablet and the bag which are used together to carry out the method.

Further objects of the present invention will be apparent from a consideration of the accompanying specification, claims and drawing.

BRIEF DESCRIPTION OF DRAWING

FIG. 3 is a view showing the bag with the open end thereof tied closed and being compressed by being stepped on;

DESCRIPTION OF THE PREFERRED EMBODIMENT

Figure 1:
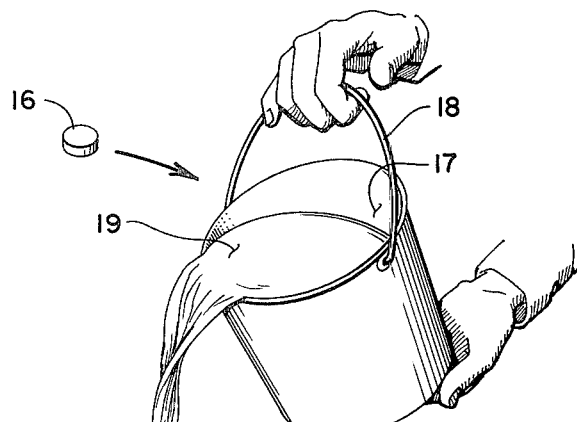
FIG. 1 is a perspective view of the composting bag of my invention showing an aqueous mixture being applied to organic material which has been placed in the bag.

Referring to FIG. 1, the bag used in the invention is shown as substantially filled with compostable organic material and with the aqueous solution being added thereto. The bag may be of any of various types having apertures therethrough. One bag which I have found particularly desirable to employ is a plastic yard bag which has been provided with a number of perforations. A bag suitable for this purpose is a polyethylene bag in which the polyethylene material has a thickness of four mils. A seven-bushel capacity bag is a size which is convenient for the purpose. It is also desirable to employ a dark colored bag in order to facilitate the absorption of heat from the sun.

Referring specifically to FIG. 1, the bag is indicated by the reference numeral 10 and the perforations by the reference numerals 11. These perforations are preferably ¼-inch diameter holes disposed about a six-inch center. In other words, the distance between any two diagonal holes is twelve inches. These holes may vary in size but they should be sufficiently large to permit the ready passage of air or gas therethrough while at the same time preventing the escape of any substantial amount of the compostable material. It has been found that with ¼-inch holes, practically no material escapes since such compostable material is in the form of blades of grass or leaves which tend to mat and which have a long dimension far in excess of ¼ inch.

Figure 2:
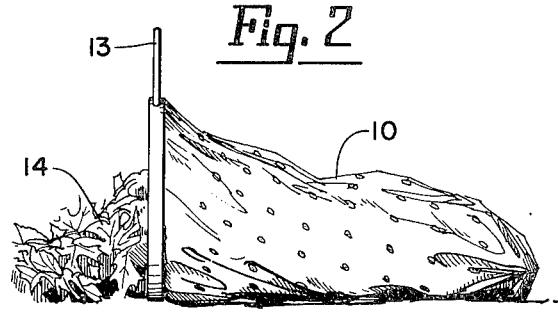
FIG. 2 shows a bag being filled with leaves.
Figure 3:
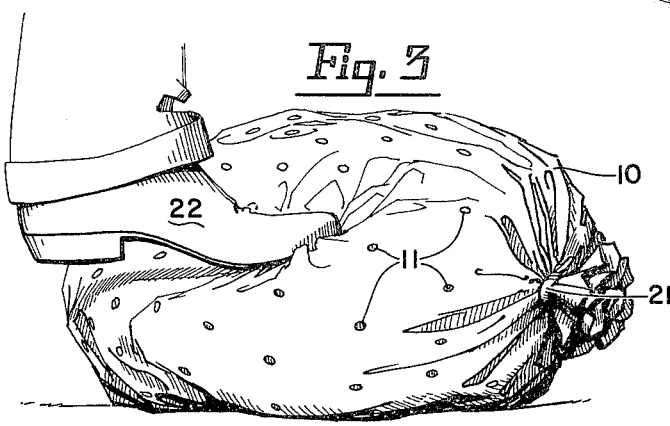

The bag 10, as indicated above, is preferably of a dark color such as black. The holes 11, as indicated in FIGS. 2 and 3, do not extend all the way up to the open end of the bag since it is desirable from the standpoint of the strength of the bag to keep the material adjacent the open end unperforated. It is this portion of the material which is grasped to tie the bag closed and to manipulate the bag during the bag filling operation and during the composting operation.

In FIG. 2, I have shown the bag as being filled with leaves. For convenience, a bag gripping member having a handle 13 has been secured to the open end of the bag. It will be noted that the bag is being forced into a pile of leaves 14 to cause the leaves to enter into and fill the bag 10. The leaves are periodically compressed in the bag so as to result in the bag being filled relatively firmly.

It is, of course, understood that the bag 10 may be filled in other ways. Thus, it may be attached to the outlet of a lawn mower and automatically filled with grass cuttings. Or, where a shredder is employed, the bag 10 may be secured to the outlet of the shredder.

When the bag is substantially filled with organic material, as shown in FIG. 1, a composting tablet 16 is dissolved in a container of water. I have shown the container 17 as in the form of a bucket having a handle 18. Where the bag is a seven-bushel capacity bag, it is desirable to employ approximately 2 gallons of water. It has been found that this amount of water provides the necessary moisture to complete the composting action. The tablet 16 has a binder of a water soluble material which is preferably effervescent. One suitable material is sodium bicarbonate with an acid added thereto. As soon as such a tablet is exposed to water, it decomposes very rapidly. The active ingredients of the tablet are a large number of minute particles which accelerate the composting action. These particles may desirably be natural microorganisms of decomposition. It is also desirable to incorporate in the tablet certain enzymes which accelerate the activity of the microorganisms. It is necessary in order for these microorganisms to become effective that there be a supply of nitrogen. To a certain extent, the nitrogen can be obtained from the material being composted. It is helpful, however, in order to insure that the composting action is relatively rapid, for some nitrogen-releasing compound to be added. Such a compound can take the form of any of various nitrates, ammonium compounds, carbohydrates, proteins and various synthetic slow-release forms of nitrogen-containing compounds. One substance that we have found desirable is a pre-gelatinized durum wheat which contains both carbohydrates and proteins. The microorganisms are, of course, dormant until the tablet is dissolved in water. Upon a tablet 16 being added to a container of water, the binder immediately dissolves and the various microorganisms are activated.

The aqueous mixture in the bucket 17 is referred to by the reference numeral 19. As best shown in FIG. 1, the aqueous mixture 19 is then poured into the organic material in bag 10. Despite the apertures 11, the liquid does not run out through the apertures since it is absorbed and retained in the organic material. As soon as the material 19 has all been poured into the bag 10, the upper portion of the bag is twisted together and secured by a tie 21. This tie can be of any suitable type such as a piece of string. I have found it desirable, however, to employ the conventional twist tying device which commonly comprises a strand of wire covered with two strips of paper or plastic and which when twisted retains its shape by reason of the rigidity of the wire.

The bag is now placed on the ground at a suitable location, as shown in FIG. 3. It is desirable to place the bag in a place where it is exposed to some extent to the sun so that heat can be absorbed from the sun and increase the temperature in the bag. The activity of microorganisms is accelerated when the temperature within the bag is relatively warm. It is, of course, understood that the decomposition resulting from the activity of the microorganisms produces heat in itself.

Figure 4:
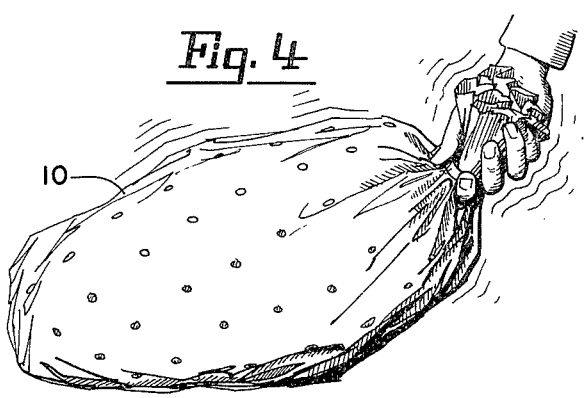
FIG. 4 is a view showing the fluffing of the bag to draw in air after the bag has been compressed.

The composting action tends to generate gases. Furthermore, it is desirable to periodically introduce fresh air into the bag to replace the oxygen and other gases being consumed in the composting process. It is for this reason that in conventional compost heaps, it is desirable to periodically turn the composting material to release gases accumulated therein and to exposed the composting material to fresh air. In the method of the present invention, this is accomplished by periodically compressing the bag to force the gases out through the perforations 11 and to then fluff the bag to draw in fresh air. In FIG. 2, I have shown the bag 10 as being stepped upon by a foot 22. The bag can be stepped on in several locations forcing the accumulated gases out through the openings 11. The bag can now be grasped, as shown in FIG. 4, and shaken to "fluff" out the bag and draw in fresh air. This operation of first compressing the bag and then agitating it to introduce fresh air should preferably be done every three or four days.

Figure 5:
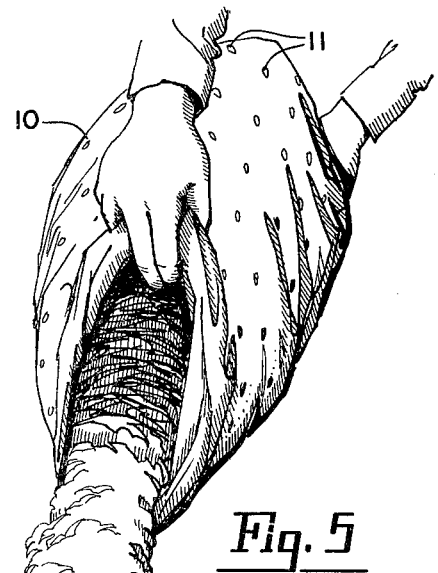
FIG. 5 is a view showing the bag being emptied of composted material after the composting operation has been completed.

It has been found that if the proper amount of water is added initially and if the bag is periodically compressed and then agitated, as described above, the composting action can be completed without ever opening the bag. In typical cases during the summer weather, it has been found that the entire composting action can be completed in about four to six weeks. Where the temperature is below 50° F., the composting action will take longer. After the composting action has been completed, the bag can be opened and the contents deposited where needed. The material may be used as a top dressing on a lawn or as a planting medium for new plants and as a soil amendment around old plants. In FIG. 5, I have shown the material as being poured out of the bag 10 and onto a desired spot for utilization of the composted material. The fact that the composted material is already in a bag facilitates dispensing the material since it is unnecessary for it to be directly handled.

Figure 6:
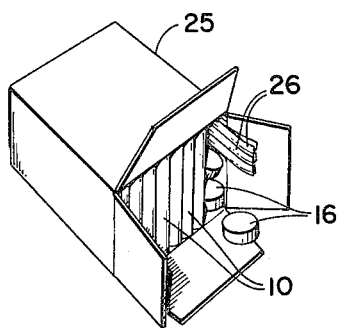
FIG. 6 is a view of a typical composting kit containing several of the perforated bags, composting tablets, and ties for holding the bag closed.

In FIG. 6, I have shown a typical kit for carrying out the method of the present invention. This kit includes a carton 25 having a plurality of bags 10 therein. Also included in the carton are a plurality of composting tablets 16 and a plurality of twist tying devices 26. The tablets 16, while shown loose in the box 25 will normally be within their own container to prevent damage thereto. Furthermore, instead of using a box 25, a plastic bag may be employed for holding the bags 10, the box of tablets 16 and the twist tying devices 21. It will be readily seen that with the equipment shown in carton 25, it is possible to carry out the method of the present invention in connection with a number of bags of compostable material.

It will also be seen that the method of the present invention not only results in a very rapid composting action but it also eliminates any unsightly compost heap. The bags 10 are relatively attractive in appearance as compared with a typical composting bin. A further advantage of the use of the bags is that the extent to which the composting material must be handled during the composting operation or after it is completed, is relatively small. As pointed out above, the removal of the gases and the admission of fresh air is accomplished without ever opening the bag. EVen after the composting is completed, the bag provides a means by which the composting material can be poured out in the desired quantities at the desired locations.

It will thus be seen that I have provided a composting method and equipment for quickly composting organic material with a minimum amount of effort and in a manner much more attractive than previous processes. While I have shown and described a specific embodiment of my invention, it is to be understood that this is only for purposes of illustration and that the scope of my invention is limited solely by the appended claims.

I claim:

1. A method of rapidly composting organic material, which method comprises:

providing a flexible bag having an open end, a plurality of apertures through the body portion of the bag, said apertures being sufficiently large to permit the ready passage of air and gas therethrough but sufficiently small to prevent the escape therethrough of any substantial amount of the organic material to be composted, substantially filling said bag with organic material to be composted, adding thereto a predetermined amount of an aqueous solution containing therein numerous minute particles which tend to facilitate decomposition of the organic material, closing the open end of said bag so that said bag is substantially closed except for said apertures therethrough, placing said bag upon a supporting surface which normally maintains said bag in a stationary condition, periodically compressing said bag to force out of said bag gases accumulating therein as a result of such decomposition, and then manipulating the bag to allow air to enter therein through said apertures.

2. The method of claim 1 in which said bag is of a dark color to absorb heat and thus increase the temperature within the bag.

3. The method of claim 1 in which the minute particles are natural micro-organisms.

4. The method of claim 1 in which the manipulation of said bag to allow air to enter therein involves agitating the same.

5. The method of claim 4 in which said bag is compressed by stepping on the same and is agitated by fluffing the same to create pockets of air therein.

6. The method of claim 1 in which said aqueous solution is formed by dissolving in water one or more tablets containing said minute particles and a water soluble binder.

7. The method of claim 6 in which said tablets further contain a nitrogen releasing substance.

* * * * *

Disclaimer

3,934,999.—*Harold R. Meier*, Minneapolis, Minn. COMPOSTING METHOD AND APPARATUS. Patent dated Jan. 27, 1976. Disclaimer filed Dec. 13, 1976, by the assignee, *Judd Ringer Corporation.*

Hereby enters this disclaimer to claim 7 of said patent.

[*Official Gazette February 8, 1977.*]